(12) United States Patent
Thomas (10) Patent No.: US 9,845,837 B2
(45) Date of Patent: Dec. 19, 2017

(54) GUIDE ASSEMBLY FOR A DISC BRAKE (71) Applicant: MERITOR HEAVY VEHICLE BRAKING SYSTEMS (UK) LIMITED, Cwmbran, Gwent (GB)

(72) Inventor: Paul Thomas, Gwent (GB)

(73) Assignee: Meritor Heavy Vehicle Braking Systems (UK) Limited, Cwmbran, Gwent (GB)

( * ) Notice: Subject to any disclaimer, the term of this patent is extended or adjusted under 35 U.S.C. 154(b) by 0 days.

(21) Appl. No.: 14/643,174

(22) Filed: Mar. 10, 2015

(65) Prior Publication Data
US 2015/0323022 A1 Nov. 12, 2015

(30) Foreign Application Priority Data
May 7, 2014 (EP) .................................. 14167442

(51) Int. Cl.
F16D 65/14 (2006.01)
F16D 55/2265 (2006.01)
F16D 55/227 (2006.01)
B23B 41/00 (2006.01)
B23B 49/02 (2006.01)
F16D 65/00 (2006.01)
F16D 55/00 (2006.01)

(52) U.S. Cl.
CPC ........ F16D 55/22655 (2013.01); B23B 41/00 (2013.01); B23B 49/02 (2013.01); F16D 55/227 (2013.01); F16D 2055/0016 (2013.01); Y10T 408/03 (2015.01)

(58) Field of Classification Search
CPC ........... F16D 55/2265; F16D 55/22655; F16D 55/227; F16D 2055/0016; B23B 41/00; B23B 49/02
USPC ........................................... 188/73.44, 73.45
See application file for complete search history.

(56) References Cited

U.S. PATENT DOCUMENTS 6,991,073 B2 * 1/2006 Macke .................... F16C 29/02
188/73.1
2004/0173420 A1 * 9/2004 Macke .................... F16C 29/02
188/250 G (Continued)

FOREIGN PATENT DOCUMENTS

DE 102004055527 A1 5/2006
DE 202008006779 U1 7/2008
EP 0697536 A2 2/1996

(Continued)

OTHER PUBLICATIONS

European Patent Office, Extended Search Report for the corresponding European Patent Application No. 14167442.4 dated Oct. 16, 2014.

Primary Examiner — Melody Burch
(74) Attorney, Agent, or Firm — Brooks Kushman P.C.

(57) ABSTRACT

A guide assembly for a disc brake, the guide assembly comprising a bore disposed in a disc brake caliper for receiving a guide pin. The bore comprises a first bore portion with a substantially circular cross-sectional profile and a second bore portion with a substantially circular cross-sectional profile arranged sequentially along the length of the bore and tangentially offset such that the bore is defined by the overlap of the first bore portion and second bore portion and has a lens-shaped cross-sectional profile.

15 Claims, 8 Drawing Sheets (56) References Cited

U.S. PATENT DOCUMENTS

2009/0236188 A1* 9/2009 Raffin ................. F16D 65/0974
　　　　　　　　　　　　　　　　　　　　188/73.31
2011/0284332 A1* 11/2011 Champion ........ F16D 55/22655
　　　　　　　　　　　　　　　　　　　　188/73.45

FOREIGN PATENT DOCUMENTS

| GB | 1573305 | | 8/1980 |
| JP | 861401 A | * | 3/1996 |
| JP | 2011252544 A | * | 12/2011 |

* cited by examiner

GUIDE ASSEMBLY FOR A DISC BRAKE

TECHNICAL FIELD

The present invention relates to a disc brake and particularly but not exclusively to a guide assembly for slidably mounting a caliper of a disc brake.

BACKGROUND

Disc brakes are commonly used for braking heavy vehicles such as trucks, buses and coaches.

Disc brakes conventionally comprise a brake carrier and a caliper. The brake carrier is arranged to carry brake pads on each side of a rotor. The caliper is slidably mounted on the brake carrier by two or more guide assemblies, such that when the disc brake is actuated, the caliper is able to slide with respect to the brake carrier so as urge the brake pads onto a rotor in a clamping action and thereby effect braking.

A guide assembly typically comprises a guide pin along which the caliper can slide and a bore disposed in the caliper for receiving the guide pin.

To achieve free sliding of the caliper in a broad range of operating conditions, the guide assemblies must take account of manufacturing tolerances, effects of heating or cooling in use, and accommodate deflections of the disc brake due to the braking torque.

Previously, it has been found that these constraints can be compensated by inserting an oval, solid guide bush in the bore to guide the guide pin, the diameter of the oval being approximately 2 mm greater in the lateral direction where play is required than in the other, perpendicular direction. However, this solution is undesirable because the manufacture and insertion of oval, solid guide bushes (for example, by using a casting or sintering process) is complex, time consuming and expensive.

SUMMARY

The present invention seeks to alleviate the problems associated with the prior art.

Accordingly a first aspect of the invention provides a guide assembly for a disc brake, the guide assembly comprising: a bore disposed in a disc brake caliper for receiving a guide pin, wherein the bore comprises a first bore portion with a substantially circular cross-sectional profile and a second bore portion with a substantially circular cross-sectional profile arranged sequentially along the length of the bore and tangentially offset such that the bore has a lens-shaped cross-sectional profile.

Due to the lens-shaped cross-sectional profile of the bore, clearance between the guide pin and the bore in the tangential direction Y is reduced or minimised and clearance between the guide pin and bore in the circumferential direction X is increased or maximised. Accordingly, the undesirable effects of noise, stress and excess wear due to vibration in a tangential direction Y are restricted, whilst the manufacturing tolerances and deflections due to braking torque in a circumferential direction X are accommodated.

Providing a bore with a lens-shaped cross-sectional profile advantageously avoids the need for an oval, solid bush to guide the guide pin. Moreover, the formation of a bore with a lens-shaped cross-sectional profile defined by the overlapping parts of sequential and tangentially offset bore portions with substantially circular cross-sectional profiles is simpler, quicker and more cost-effective than the complex, time-consuming and expensive manufacturing of an oval, solid bush.

In an embodiment where the diameter of the first bore portion is D, length of the first bore portion is L1, the diameter of the second bore portion is D, the length of the second bore portion is L2 and the centreline of the second bore portion is tangentially offset from the centreline of the first bore portion by a predetermined distance O, the tangential diameter of the bore TD=D−O, the circumferential diameter of the bore RD=D and the length of the bore L=L1+L2.

The first bore portion and second bore portion may have substantially the same diameter and/or may be offset solely in the tangential direction.

The first bore portion and second bore portion may be offset by a distance of between 5-20%, preferably by a distance between 9-15% or even more preferably by a distance of 12% of the average diameter of the first bore portion and second bore portion. Due to the lens-shaped cross-sectional profile of the bore, the clearance between the guide pin and the bore in the tangential direction Y may be a distance of between 0.1-0.6 mm, or preferably by a distance of between 0.15-0.2 mm and the clearance between the guide pin and the bore in the circumferential direction X may be a distance of between 1-2 mm.

The first bore portion and second bore portion may be of substantially equal length.

At least one, but preferably both, of the first and second bore portions may further comprise a guide bush member mounted therein.

Due to the configuration of the bore portions, the guide bush members also have a sequential and tangentially offset arrangement such that the guide bush subsequently has a lens-shaped cross-sectional profile in overlap.

Advantageously, forming a guide bush with an lens-shaped cross-sectional profile in overlap by inserting guide bush members with substantially circular cross-sectional profiles into sequential and tangentially offset bore portions is a simpler process than the complex, time-consuming and expensive manufacturing of an oval, solid bush by prior art methods.

The guide assembly may further comprise a guide pin along which the disc brake caliper can slide relative to a carrier of the disc brake. The guide pin may comprise a fastener for securing the guide pin to the carrier of the disc brake and a sleeve having an outer guide surface.

A second aspect of the invention provides a disc brake caliper comprising a first bore for receiving a first guide pin, the bore comprising: a first bore portion having a substantially circular cross-sectional profile; and a second bore portion having a substantially circular cross-sectional profile, whereby the first bore portion and second bore portion are arranged sequentially along the bore and tangentially offset such that the bore has a lens-shaped cross-sectional profile.

The disc brake caliper may comprise a guide bush located within the first bore. The guide bush may comprise: a first guide bush member inserted in the first bush portion, having a substantially circular cross-sectional profile and forming a close fit with the first bore portion; and a second guide bush member inserted in the second bush portion, having a substantially circular cross-sectional profile and forming a close fit with the second bore portion.

The disc brake caliper may advantageously further comprise a second bore, the second bore having a substantially circular cross-sectional profile. At least one bush member having a substantially circular cross-sectional profile may be located in the second bore. The bush members mounted within the first bore and second bore may be substantially identical.

In a third aspect of the present invention, there is provided a disc brake comprising a disc brake caliper according to the second aspect of the present invention and a disc brake carrier, the disc brake carrier comprising a first guide pin arranged to be received in the first bore.

If the disc brake caliper further comprises the second bore, then the disc brake carrier has a second guide pin arranged to be received in the second bore.

A fourth aspect of the present invention provides a method of forming a bore in a disc brake caliper, the method comprising: machining from a first side of the caliper to form a first bore portion with a substantially circular cross-sectional profile; and machining from a second side of the caliper to form a second bore portion with a substantially circular cross-sectional profile that is sequential and tangentially offset from the first bore portion.

The method may further comprise inserting a first guide bush member with a substantially circular cross-sectional profile in the first bore portion and inserting a second guide bush member with a substantially circular cross-sectional profile in the second bore portion.

A further aspect of the invention provides a method of forming a bush for receiving a guide pin, the method comprising: providing a strip of metal; broaching or otherwise machining two portions of the strip so as to thin those portions with respect to the remainder of the strip; forming the strip into a tube such that the two portions are on opposing inner faces of the tube.

BRIEF DESCRIPTION OF THE DRAWINGS

Embodiments of the present invention will now be described, by way of example only, with reference to the accompanying drawings in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Referring to FIGS. 1 to 7, a guide assembly for a disc brake 8 according the present invention is indicated generally at 10. The guide assembly is provided in the disc brake 8 to slidably mount a caliper 20 of the disc brake with respect to a brake carrier 30 of the disc brake.

In a first embodiment of the guide assembly 10 as shown in FIGS. 1 to 4, the guide assembly 10 comprises a guide pin 11 along which the caliper 20 can slide and a bore 12 disposed in the caliper for receiving the guide pin.

The guide pin 11 comprises a fastener to secure the guide pin to the brake carrier. In the first embodiment depicted in FIGS. 1 to 4, the fastener is a bolt 11a that affixes to the brake carrier by screwing into a threaded bore in the brake carrier 30.

Figure 2:
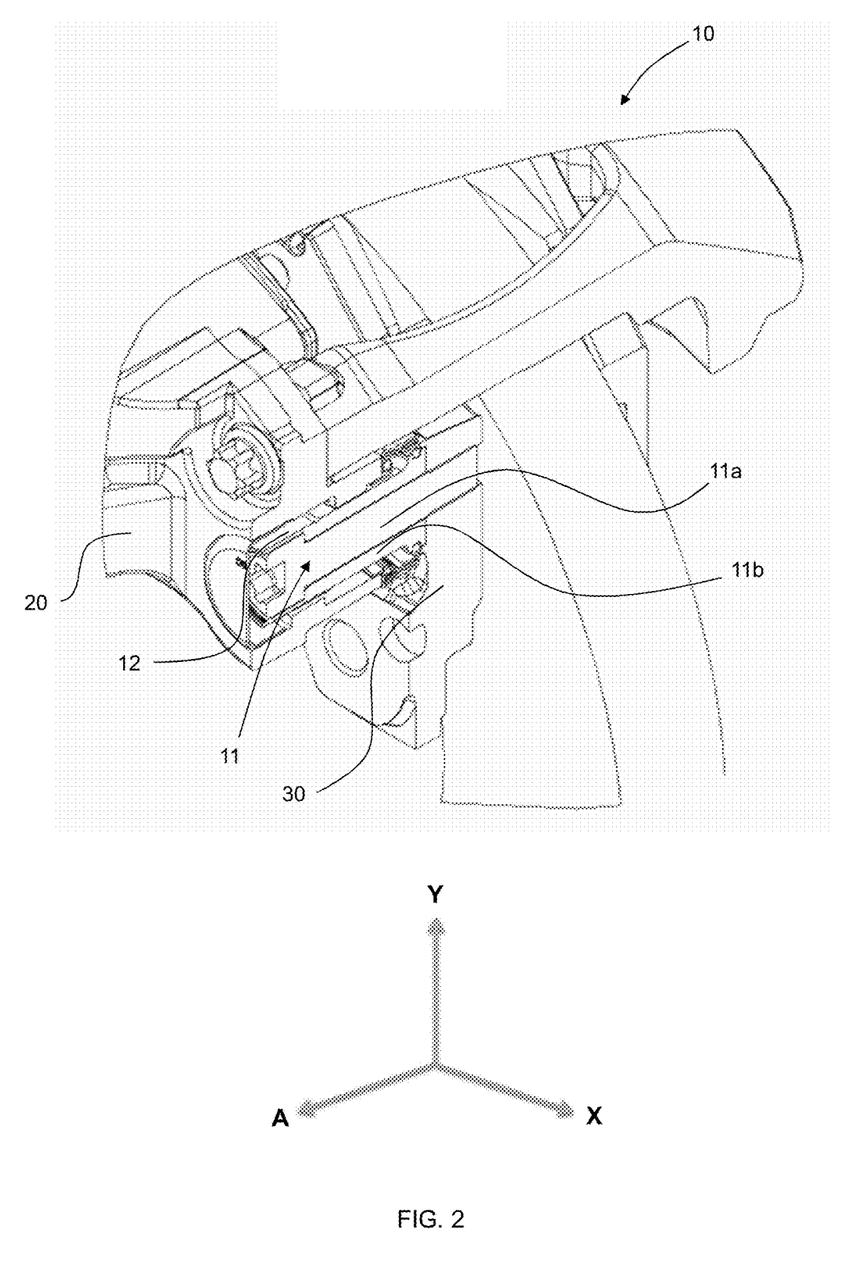
FIG. 2 is an enlarged isometric cross-sectional view of the guide assembly shown in FIG. 1.

With particular reference to FIG. 2, the guide pin 11 further comprises a guide sleeve 11b at least substantially surrounding the fastening means and over which the caliper 20 slides. The sleeve is a hollow, thin-walled tube with a substantially circular cross-sectional profile. The outer surface of the sleeve may be coated with PTFE to aid the sliding action of the caliper along the guide pin.

When attached to the brake carrier 30, the guide pin 11 extends in an axial direction A. Direction A is parallel to an axis R of rotation of a rotor 40 (shown in part) of the disc brake 8 and parallel to the transverse axis of the disc brake.

The bore 12 of the guide assembly 10 is an elongate hole extending from a first caliper side (inboard) 20a to the second caliper side 20b (outboard) of the caliper. The caliper 20 is slidably mounted with respect to the brake carrier 30 by sliding the guide pin 11 through the bore 12. Hence, when the disc brake is actuated, the caliper 20 is able to slide in the axial direction A along the guide pin 11.

The bore 12 comprises a first bore portion 12a with a first substantially circular cross-sectional profile and a second bore portion 12b with a second substantially circular cross-sectional profile. The first bore portion 12a and second bore portion 12b are arranged sequentially along the bore and offset in a tangential direction Y. Direction Y is tangential to a circle described by the rotation of the rotor 40 of the disc brake 8, perpendicular to the axial direction A, perpendicular to the longitudinal axis of the disc brake and parallel to the direction in which brake pads 50a, 50b are inserted or removed from the brake carrier 30.

Figure 3:
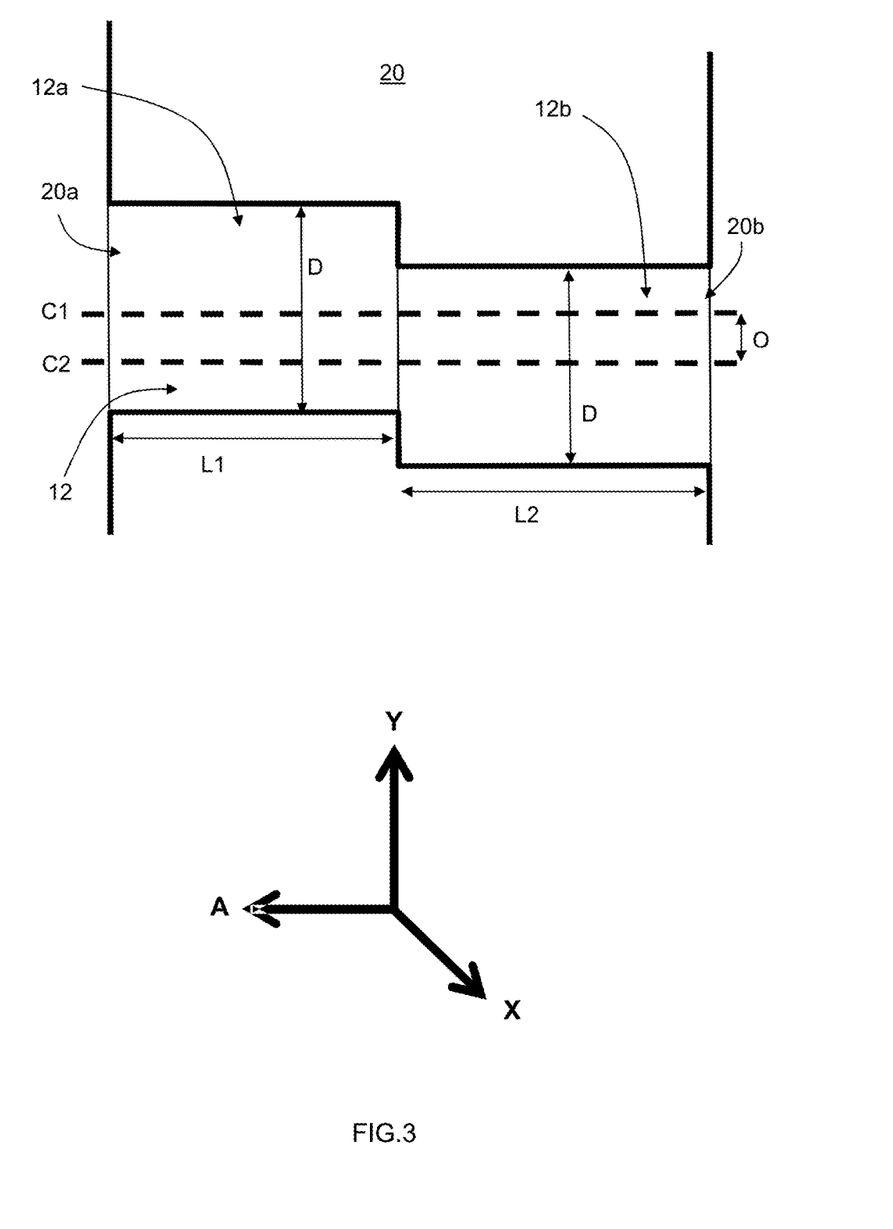
FIG. 3 shows a cross-sectional view of the bore of the guide assembly of FIG. 1.
Figure 4:
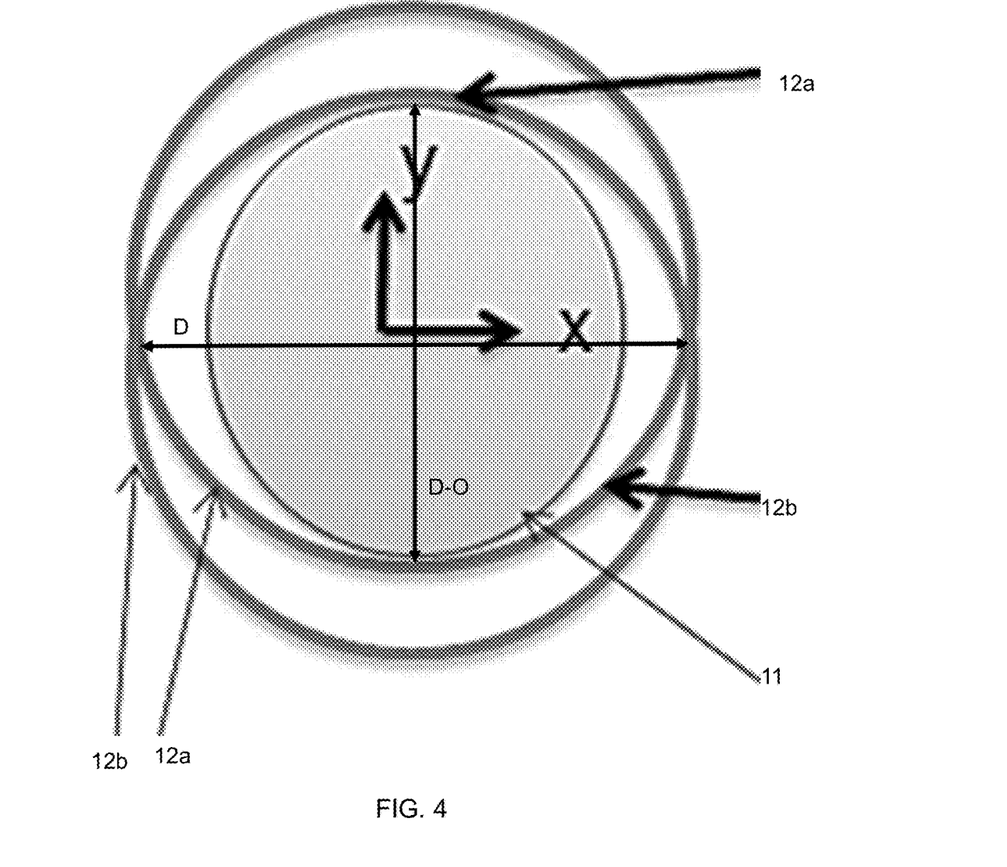
FIG. 4 shows schematically the cross-sectional profile of the bore of the guide assembly of FIG. 1 normal to the cross-section of FIG. 3.

Due to the sequential and tangentially offset arrangement of the first bore portion and second bore portion the cross-sectional profiles of each of the bore portions intersect such that the bore subsequently has a stepped longitudinal profile as shown in FIG. 3 and a quasi-oval cross-sectional profile, where the two bore portions 12a and 12b overlap as shown in FIG. 4. The smallest cross-sectional dimension of the bore extends in the tangential direction Y. The largest cross-sectional dimension of the bore extends in a generally circumferential direction X. Direction X is perpendicular to the axial direction A, perpendicular to the tangential direction Y and parallel to the longitudinal axis of the disc brake.

To allow the caliper to slide along the guide pin, the diameter of the guide pin 11 is selected to correspond approximately to the tangential diameter of the bore 12. Therefore, the clearance between the bore 12 and the guide pin 11 in the tangential direction is minimised, vibration is reduced and so the undesirable effects of noise, stress and excess wear are restricted. Whereas, the greater clearance provided between the bore and the guide pin in the circumferential direction X provides sufficient lateral play to allow for manufacturing tolerances and deflections of the brake carrier and guide pin due to the braking torque. In practice this results in the guide pin being in potential sliding contact with the lower part of bore portion 12a and the upper part of bore portion 12b only, because these are the surfaces that form the lens-shaped profile.

The sequential and tangentially offset bore portions 12a, 12b can be formed by machining the first bore portion into the caliper from the first caliper side 20a with a predetermined diameter and depth and machining the second bore portion into the caliper from the second caliper side 20b with a predetermined diameter, depth and offset displacement until they intersect. Due to the circular cross-sectional profiles of the bore portions, the bore portions may be machined using conventional drilling techniques. Hence, the bore 12 can be formed simply, quickly and cost effectively. The bore may be treated or coated after machining in order to improve its wear performance.

The first bore portion and second bore portion may have different diameters or substantially the same diameter. The first bore portion and second bore portion may have different lengths or substantially the same length. The first bore portion and second bore portion may be offset solely in the tangential direction Y.

In the first embodiment depicted in FIGS. 1 to 4, the first bore portion 12a has a cross-sectional circular profile with diameter D and length L1, the second bore portion has a cross-sectional circular profile with diameter D and length L2 and the centreline C1 of the first bore portion is offset solely in the tangential direction to the centreline C2 of the second bore portion by displacement O. The centrelines C1 and C2 are substantially parallel. The resulting bore has a length L=L1+L2 and has a quasi-oval, overlapping cross-sectional profile where the minimum diameter in the tangential direction TD=D−O and the maximum diameter in the circumferential direction RD=D.

In geometric terms, the overlap may be considered a symmetric lens, although given the limited offset with respect to the diameters of the bores, the shape 25 approximates sufficiently to an oval of the prior art bush to be functionally equivalent.

Figure 5:
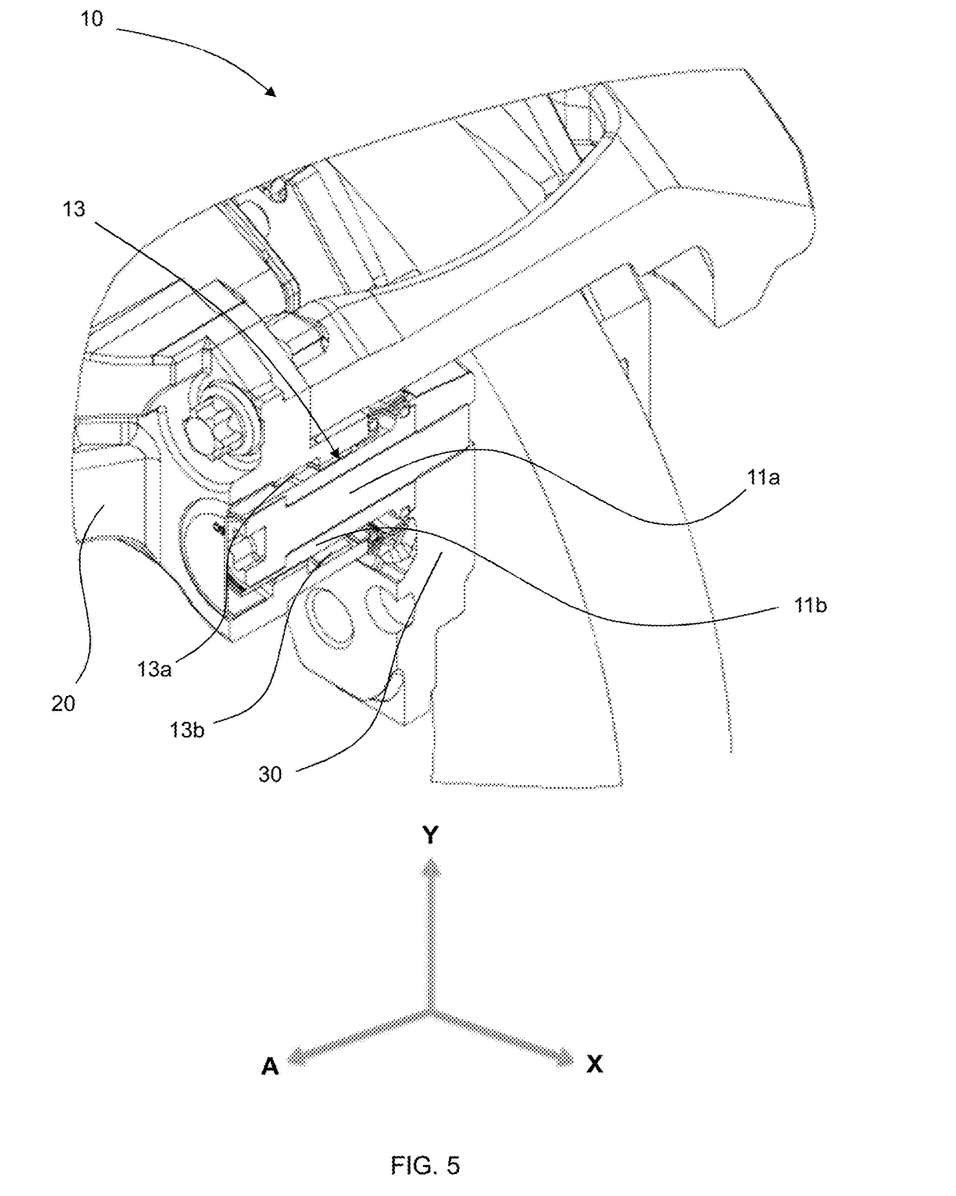
FIG. 5 shows a perspective, cross-sectional view of guide assembly of a second embodiment of the present invention.
Figure 6:
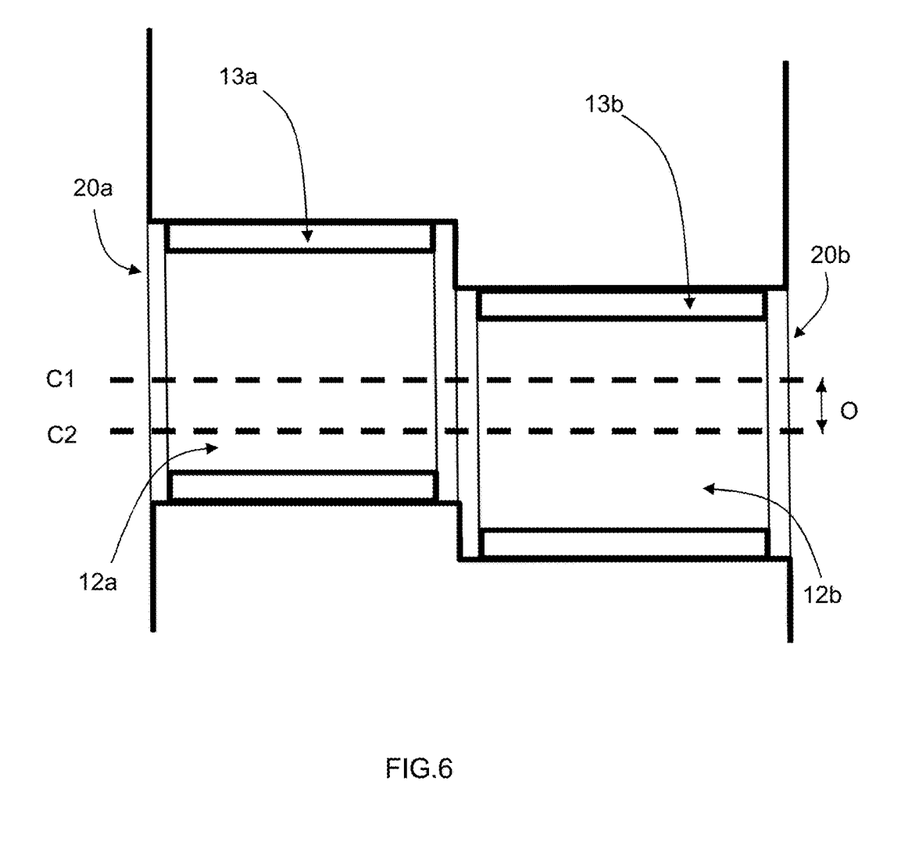
FIG. 6 shows a cross-sectional view of the bore of the guide assembly of FIG. 5.
Figure 7:
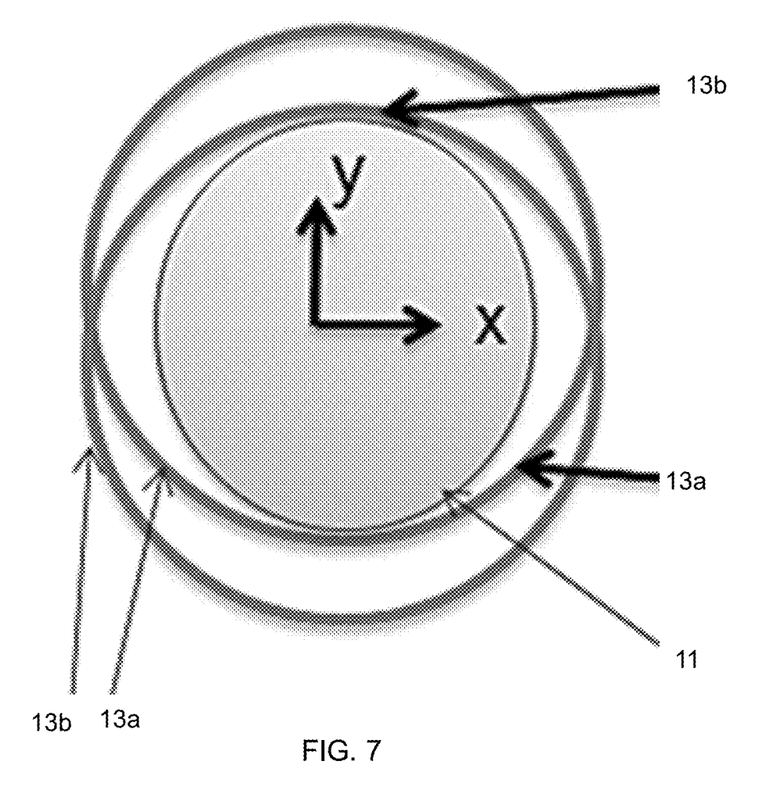
FIG. 7 shows schematically a cross-sectional profile of the bush of the guide assembly of FIG. 5 normal to the cross-section of FIG. 6.

In addition to the features of the first embodiment of the guide assembly a second embodiment of the guide assembly as shown in FIGS. 5 to 7 also includes a bush 13 to guide the guide pin within the bore. This arrangement is preferred as it improves the durability and serviceability of the guide assembly 10. The bush comprises a first bush member 13a and a second bush member 13b. The first bush member 13a has a substantially circular cross-sectional profile that is configured to form a close fit with the first bore portion 12a and act as an inner liner in the first bore portion. Likewise, the second bush member 13b has a substantially circular cross-sectional profile that is configured to form a close fit with the second bore portion 12a and act as an inner liner in the second bore portion. For heavy vehicle applications the internal diameter of the bush members are typically in a range of 25-40 mm.

Due to the substantially circular profiles of the bore portions, the guide bush members may comprise solid sleeved, hollow tubular bush members having a substantially circular cross-sectional profile. The bush members may be manufactured from steel, bronze, plastic, rubber or a composite of any of these, and may include a low friction coating such as PTFE. The bushes may have a plain inner surface or a suitable pattern of depressions to assist in the sliding of the caliper. In a preferred embodiment the bushes may be the same as the bushes used for a circular guide pin arrangement used at the circumferentially opposite side of the brake caliper on the brake (see below).

Due to the sequential and offset arrangement of the bore portions 12a, 12b, the cross-sectional profiles of the first bush member 13a and the second bush member 13b overlap such that the bush within the bore has a stepped longitudinal profile (see FIG. 6) and an quasi-oval cross-sectional profile (see FIG. 7).

The first bush member 13a may be inserted into the first bore portion 12a from the first caliper side 20a. The second bush member 13b may be inserted into the second bore portion 12b from the second caliper side 20b.

When a bush is provided in the bore, the diameter of the guide pin is selected to correspond to the smallest cross-sectional dimension of the bush overlap. Accordingly, the clearance gap between the guide pin and the bush in the tangential direction Y is minimal and so vibration, noise, stress and excess wear are reduced. The largest cross-sectional dimension of the bush provides a greater clearance gap between the guide pin and the bush in the circumferential direction X to allow for play due to manufacturing tolerances, heat expansion and brake torque.

The embodiments of the guide assembly are suitable for use in any type of disc brake, including pneumatic, hydraulic, electrically and mechanically actuated disc brakes. However, the embodiments are believed to be particularly beneficial in air-actuated disc brakes for heavy commercial vehicles, where rotors typically have a diameter of between 30-60 cm, meaning that the torque and heat effects may be more significant than in hydraulic disc brakes for smaller, lighter vehicles.

Figure 1:
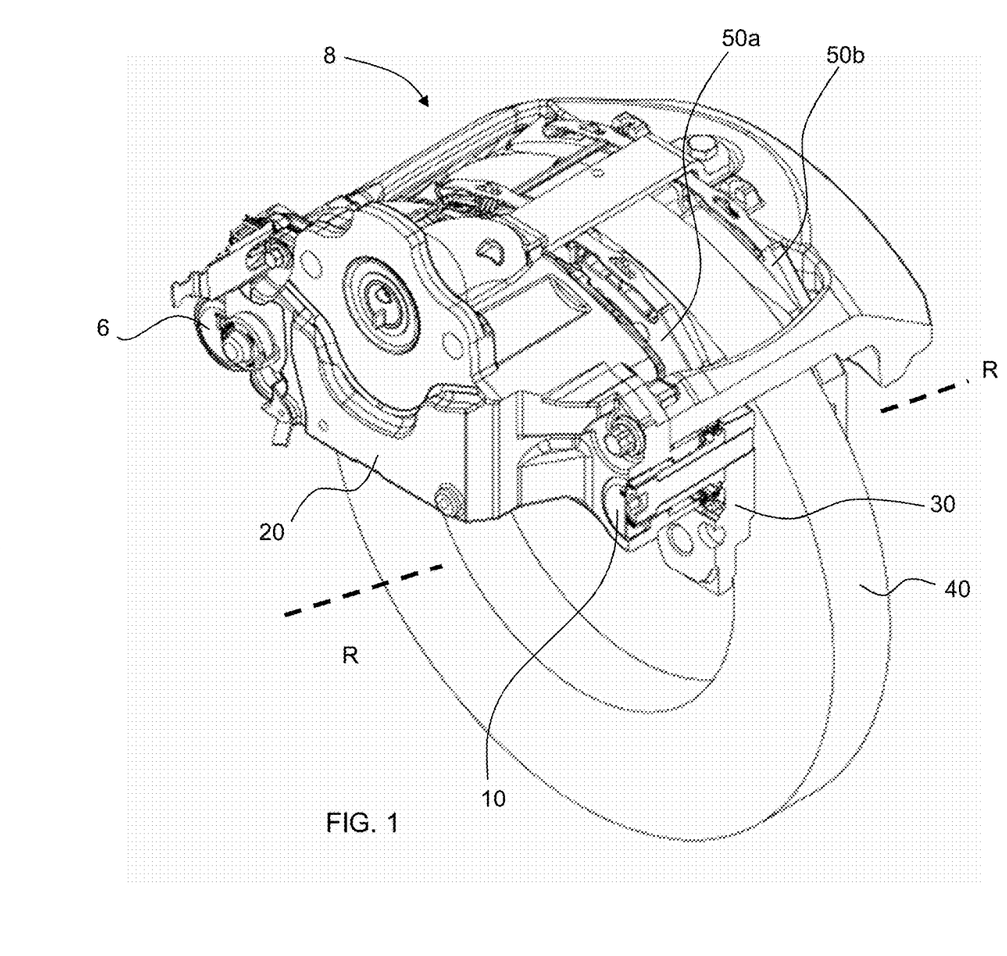
FIG. 1 is an isometric view of a disc brake having the guide assembly of a first embodiment of the present invention and sectioned through the guide assembly.

FIG. 1 depicts an embodiment of a disc brake 8. The disc brake comprises a caliper 20 slidably mounted with respect to a brake carrier 30 by two guide pin assemblies. The caliper 20 has a housing typically formed from cast iron or steel. The brake carrier 30 is typically also formed from cast iron or steel.

The brake carrier 30 carries an inboard brake pad 50a and an outboard brake pad 50b. A rotor 40, rotatable about an axis extending in the axial direction A, is positioned between the brake pads. An air actuator (not shown) is provided to move the inboard brake pad 50a into frictional contact with the rotor. When the inboard brake pad 50a is pushed towards and contacts the rotor, the caliper 20 slides inboard along the guide pins of the guide pin assemblies. As the caliper slides inboard it moves the outboard brake pad 50b towards the rotor. Hence, the rotor 40 becomes clamped between the inboard and outboard brake pads and the rotation of the rotor is frictionally inhibited. So as to accommodate installation and deflection constraints, the first guide assembly is a guide assembly 10 according to the first embodiment of the invention in which the bore has a lens-shaped cross-sectional profile. The second guide assembly is a conventional guide assembly 6 comprising a guide pin (not shown), a bore (not shown) with a circular cross-sectional profile to receive the guide pin and at least one guide bush member (not shown) with a circular cross-sectional profile to guide the guide pin within the bore. These bushes may be the same as the first and second bush members 13a and 13b, thereby minimising the number of parts required to assemble and service the brake. The guide pin of the second guide assembly 6 is preferably longer than the guide pin of the first guide assembly 10 to provide a more positive attachment and guidance to the brake carrier and location for the caliper.

Figure 8:
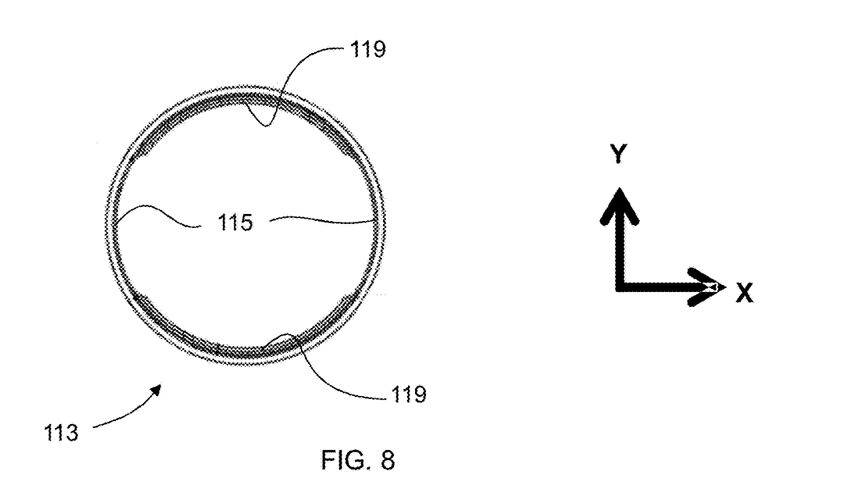
FIG. 8 shows a cross-sectional profile a bush of a guide assembly of a third embodiment of the present invention.
Figure 9:
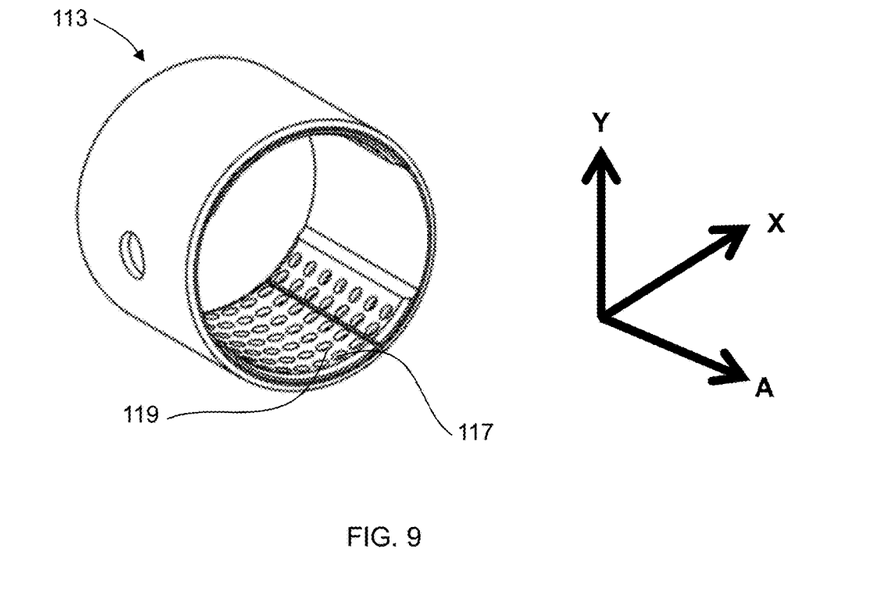
FIG. 9 shows a perspective, cross-sectional view of the bush of FIG. 8.

In an alternative embodiment of guide assembly, a conventional cylindrical bore (not shown) may be formed in the caliper by a machining operation and at least one bush 113 shown in FIGS. 8 and 9 then inserted therein. The bush is initially provided as a rectangular plate of suitable material (e.g., brass). The plate is thinned at predetermined locations 115 in a broaching or other suitable machining operation, and may also have recesses 117 formed in a sliding surface 119 thereof. The plate is then formed into the tubular bush illustrated in FIGS. 8 and 9 such that the thinned locations are on opposing sides of an inner face of the bush, and act in conjunction with a circular guide pin to provide the required amount of play in the X direction.

Advantageously, the guide pin receiving bore with a lens-shaped cross-sectional profile allows for free sliding of a guide pin and eliminates the need for an oval bush formed by a costly process, such as sintering. The manufacture of the guide pin receiving bore with the lens-shaped cross-sectional profile in overlap can be achieved in a simple and cost effective manner. In addition, the construction and insertion of guide bush members in a guide pin receiving bore having sequential and tangentially offset bore portions so as to provide a guide bush within the guide pin receiving bore with the lens-shaped cross-sectional profile is straightforward and inexpensive.

Although the invention has been described above with reference to one or more preferred embodiments, it will be appreciated that various changes or modifications may be made without departing from the scope of the invention as defined in the appended claims.

What is claimed is:

1. A guide assembly for a disc brake, the guide assembly comprising:
    a disc brake caliper having a bore that receives a single guide pin, wherein the bore comprises a first bore portion with a substantially circular cross-sectional profile and a second bore portion with a substantially circular cross-sectional profile, wherein the first bore portion and the second bore portion are arranged sequentially along a length of the bore such that the first bore portion extends from a first side of the disc brake caliper to the second bore portion, the second bore portion extends from an end of the first bore portion to a second side of the disc brake caliper that is disposed opposite the first side, and the second bore portion is tangentially offset from the first bore portion such that the first bore portion and second bore portion overlap to provide a lens-shaped cross-sectional profile;
    wherein the single guide pin is received in both the first bore portion and the second bore portion.

2. The guide assembly of claim 1 wherein the first bore portion and second bore portion have substantially equal diameters.

3. The guide assembly of claim 1 wherein the first bore portion and second bore portion are offset solely in a tangential direction.

4. The guide assembly of claim 1 wherein the first bore portion and second bore portion are offset by a distance of between 5-20% of an average diameter of the first bore portion and second bore portion.

5. The guide assembly of claim 1 wherein the first bore portion and second bore portion are of substantially equal length.

6. The guide assembly of claim 1 wherein at least one of the first and second bore portions has a guide bush member mounted therein.

7. The guide assembly of claim 1 wherein the first and second bore portions both have a guide bush member mounted therein.

8. The guide assembly of claim 1 wherein the disc brake caliper is slidable along the single guide pin relative to a brake carrier of the disc brake.

9. The guide assembly of claim 8 wherein the single guide pin comprises a fastener for securing the single guide pin to the brake carrier of the disc brake and a sleeve having an outer guide surface.

10. A disc brake comprising:
    a disc brake caliper having a first bore that receives a single guide pin, wherein the first bore includes:
    a first bore portion having a substantially circular cross-sectional profile; and
    a second bore portion having a substantially circular cross-sectional profile, wherein the first bore portion and the second bore portion are arranged sequentially along a length of the first bore such that the first bore portion extends from a first side of the disc brake caliper to the second bore portion, second bore portion extends from an end of the first bore portion to a second side of the disc brake caliper that is disposed opposite the first side, and the second bore portion is tangentially offset from the first bore portion such that the first bore as defined by an overlap of the first bore portion and second bore portion has a lens-shaped cross-sectional profile; and
    the single guide pin is received in both the first bore portion and the second bore portion.

11. The disc brake of claim 10 further comprising a disc brake carrier that includes the single guide pin arranged to be received in the first bore.

12. The disc brake of claim 11 wherein the disc brake caliper further comprises a second bore, the second bore having a circular cross-sectional profile and the disc brake carrier having a second guide pin arranged to be received in the second bore.

13. The disc brake of claim 12 wherein the first bore further comprises a bush member and the second bore further comprises a further bush member, the bush member and the further bush member being substantially identical.

14. A method of forming a bore in a disc brake caliper, the method comprising:
    machining from a first side of the disc brake caliper to form a first bore portion with a substantially circular cross-sectional profile; and
    machining from a second side of the disc brake caliper that is disposed opposite the first side to form a second bore portion with a substantially circular cross-sectional profile, wherein the second bore portion extends directly from an end of the first bore portion and is tangentially offset from the first bore portion such that the bore has a lens-shaped cross-sectional profile, wherein the first bore portion extends from the first side of the disc brake caliper to the second bore portion and the second bore portion extends from the first bore portion to the second side.

15. The method of claim 14 further comprising:
    inserting a first guide bush with a substantially circular cross-sectional profile in the first bore portion; and inserting a second guide bush with a substantially circular cross-sectional profile in the second bore portion.

\* \* \* \* \*

UNITED STATES PATENT AND TRADEMARK OFFICE
CERTIFICATE OF CORRECTION

PATENT NO. : 9,845,837 B2
APPLICATION NO. : 14/643174
DATED : December 19, 2017
INVENTOR(S) : Paul Thomas et al.

Page 1 of 1

It is certified that error appears in the above-identified patent and that said Letters Patent is hereby corrected as shown below:

Column 8, Line 31, Claim 10:
After "such that the first bore"
Delete "as" and
Insert -- is --.

Signed and Sealed this
Sixth Day of March, 2018

Andrei Iancu
*Director of the United States Patent and Trademark Office*